United States Patent [19]

Babbit, Jr. et al.

[11] 3,873,222

[45] Mar. 25, 1975

[54] ROLL-OVER PROTECTIVE STRUCTURE MOUNTING

[75] Inventors: John H. Babbit, Jr., Peoria; John D. Wait, Jr., Dunlap, both of Ill.

[73] Assignee: Caterpillar Tractor Co., Peoria, Ill.

[22] Filed: Mar. 5, 1973

[21] Appl. No.: 338,218

[52] U.S. Cl............. 403/253, 248/1, 292/DIG. 39, 280/150 C
[51] Int. Cl............................................ F16b 21/00
[58] Field of Search ......... 296/102, 35.1; 248/9, 10, 248/24, 25, 1, 2, 48; 403/253, 254, 255, 258, 260, 261, 263, 334, 84, 365, 225, 227, 259; 37/142 A, 142 R; 280/150 C; 16/137, 147; 339/232

[56] References Cited
UNITED STATES PATENTS

| | | | |
|---|---|---|---|
| 3,235,244 | 2/1966 | Hein | 248/10 |
| 3,436,860 | 4/1969 | James | 16/147 |
| 3,721,463 | 3/1973 | Attwood et al. | 403/258 |

Primary Examiner—Werner H. Schroeder
Assistant Examiner—Conrad L. Berman
Attorney, Agent, or Firm—Phillips, Moore, Weissenberger, Lempio & Strabala

[57] ABSTRACT

Mounting devices for use particularly in mounting a cab to a tractor at a plurality of points. Each mounting device includes an extended member associated with the cab, this member being downwardly extending and defining a conical surface tapered inwardly of the longitudinal axis of the extended member in the direction of the extended end of that member. The extended member cooperates with socket means associated with the tractor and defining a bore into which the extended member may penetrate. The bore is actually defined by an annular substantially incompressible spacer which is positioned in an aperture defined by a socket base fixed relative to the tractor. The bore includes a conical surface which lies substantially parallel to the conical surface of the extended member. A plate is removably securable to the extended end of the extended member when it is in such penetrating position, to limit removal of the extended member from the bore.

8 Claims, 3 Drawing Figures

PATENTED MAR 25 1975  3,873,222

ROLL-OVER PROTECTIVE STRUCTURE MOUNTING

BACKGROUND OF THE INVENTION

This invention relates to means for mounting a protective cab on a tractor, and more particularly, to such means which include coacting conical surfaces for transferring load on the cab to the frame of the tractor.

Since Federal legislation has prescribed roll-over protective structures and/or cabs for all earth-moving and construction vehicles to protect operators against injury in the event of machine roll-over, manufacturers of such equipment have endeavored to provide such safety structures in an effective and economical manner. See, for example, U.S. Pat. No. 3,578,377 to Babbitt, et al., and U.S. Pat. No. 3,632,134 to Babbitt, et al., both assigned to the assignee of this application. While the cab structures of these patents have been found to be extremely safe structures, it will be understood that a further increase in safety, accompanied with facilitated production and reduction of customer cost are always desirable.

Of particular interest in this application is the preloaded mounting bracket disclosed in U.S. application Ser. No. 279,695, assigned to the assignee of this application. Such means are in fairly wide-spread use, and have been found to be quite effective. However, it has been found that these resilient mountings are not only relatively complex, but are the points most susceptible to failure during high-loads and stress occurring when a vehicle overturns. Consequently, a mounting of this type which is even less susceptible to such failure is highly desirable.

Of further interest in this area is U.S. Pat. No. 3,560,019 to Moore. Such patent discloses mounting means generally of the type described herein, incuding a bayonet mount and a sleeve. However, it is to be noted in this patent that the means for associating these two parts comprise a bolt disposed transversely of these parts and in shear. In addition, it will be seen that the alignment of such bolt may in itself be problematical, since such bolt is disposed through a number of apertures before such securing of the parts relative to each other can be realized. While such a system has been found to be reasonably effective in use, it would clearly be desirable to provide an improved apparatus for easily and conveniently securing the two parts together, and easily and conveniently releasing the two parts from each other when so desired.

SUMMARY OF THE INVENTION

It is an object of this invention to provide apparatus for mounting a cab to a tractor which overcomes the problems of the prior art by being extremely resistant to failure, by being extremely easy to align upon assembly, and by being relatively simple and economical in design.

Broadly stated, the invention comprises mounting apparatus for interconnecting first and second body members comprising an extended member fixed relative to and extending from the first body member and terminating in an extended end. Socket means are fixed relative to the second body member and define a bore sized to allow penetration of the extended member therein. Means are associated with the extended member and socket means for (i) limiting penetration of the extended member into the bore after a degree of penetration therein and (ii) transferring a load placed on the extended member in the approximate direction of the extended end thereof to the socket member. Means are removably securable on the extended end of the extended member with the extended member penetrating into the bore, for selectively limiting removal of the extended member from the bore.

BRIEF DESCRIPTION OF THE DRAWINGS

These and other objects of the invention will become apparent from a study of the following specification and drawings, in which.

DESCRIPTION OF THE PREFERRED EMBODIMENTS

Figure 1:
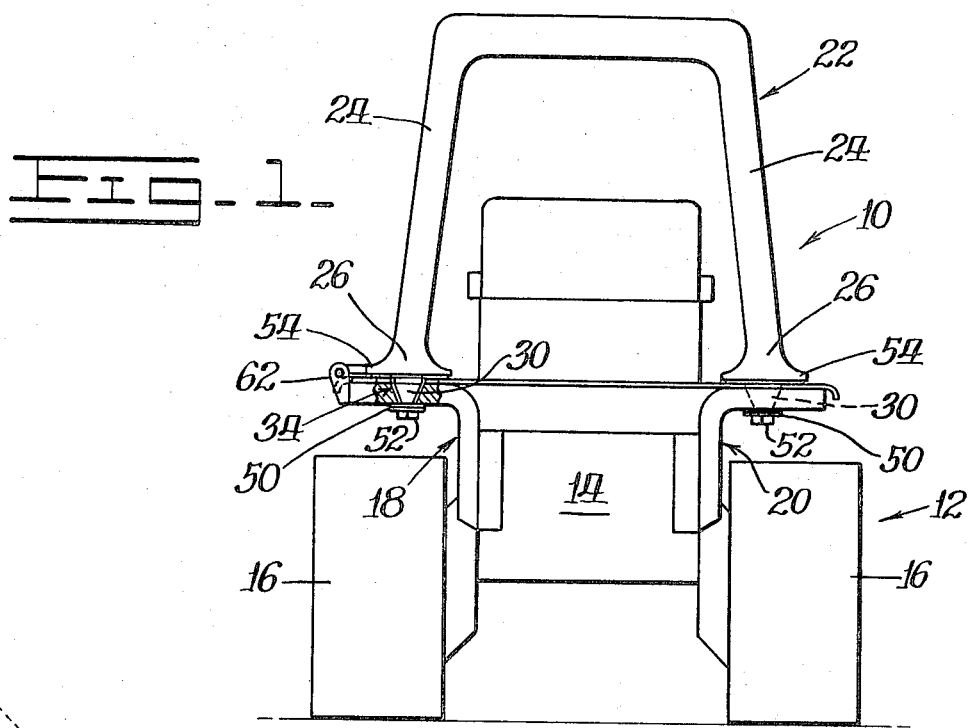
FIG. 1 is an end elevation of a tractor and cab structure mounted thereon by means of a first embodiment of mounting appartus.

Referring to FIG. 1 of the drawings, an operator station 10 is disposed rearwardly upon a tractor 12. The tractor 12 includes a main frame 14 and a pair of spaced tracks 16 used for driving and steering purposes. A pair of angled support arms (one shown at 18) are secured forwardly and rearwardly to frame 14 on one side of the tractor 12, and a pair of angled support arms (one shown at 20) are likewise secured forwardly and rearwardly to frame 14 on the other side of the tractor 12. These arms are adapted to receive and rigidly mount a roll-over protection structure or cab 22 that is supported by four legs 24 disposed about the operator station 10, one leg 24 being associated with a support arm by means which will be described in detail.

Figure 2:
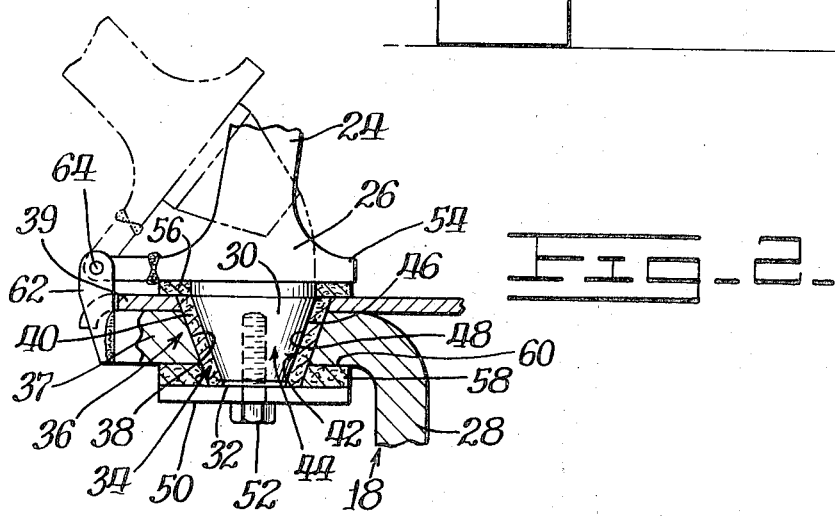
FIG. 2 is an end elevation, partially in section, of one of the mounting means as shown in FIG. 1.

The roll-over protective structure may be a structure basically similar to that shown in U.S. Pat. No. 3,632,134 cited above, exept for the means associating each leg 24 with a support arm. Since each means interconnecting a support arm and a leg is similar to the others, only the apparatus associating leg 24 with a support arm 18 (FIG. 2) will be described in detail.

The bottom end of the leg 24 includes a body member 26, and the support arm 18 includes a body member 28. The body member 26 has fixed thereto and extending therefrom an extended member 30 which terminates in an extended end 32. With the cab 22 in its position as shown in FIG. 1, such extended member 30 extends generally downwardly from the body member 26.

Fixed relative to the body member 28 are socket means 34. Such socket means 34 include a socket base 36 (including socket base portions 37, 39), which defines a conical tapered aperture 38, and a substantially incompressible annular spacer 40 which is disposed in the aperture 38. The inner surface 42 of the spacer 40 defines a bore 44.

The extended member 30 defines a tapered surface portion 46 which is actually a conical surface portion tapered inwardly of the longitudinal axis of the extended member 30 in the direction of the extended end 32 of the extended member 30.

The bore 44 is sized to allow penetration of the extended member 30 therein, as shown. The inner surface 42 of the bore 44 (which is actually the inner surface of the spacer 40), also defines a tapered surface portion 48 which is actually a conical surface portion lying substantially parallel to the conical surface portion 46 of the extended member 30 with the extended member 30 so penetrating into the bore 44. In fact, these conical surface portions 46, 48 limit the penetration of the extended member 30 into the bore 44 through their contact and coaction as shown.

Removably securable on the extended end 32 of the extended member 30 is a plate 50, being fixable thereto by means of a bolt 52 which lies substantially along the longitudinal axis of the extended member 30. The plate 50 is disposed substantially perpendicular to the longitudinal axis of the extended member 30 when so fixed thereto.

The extended member 30 has associated therewith an annular shoulder portion 54 which is actually defined by body member 26. With the extended member 30 penetrating into the bore 44, a substantially incompressible annular spacer is disposed between the socket base 36 and the shoulder portion 54, and disposed about the extended member 30 as shown.

With the extended member 30 so penetrating into the bore 44, a substantially incompressible annular spacer 58 is shown disposed between the plate 50 and an annular shoulder portion 60 defined by the socket base 36, with the plate 50 so secured as described above. With the parts assembled as shown in full in FIG. 2, it will be seen that the plate 50 is sized so that such plate 50 and socket means 34 coact to limit movement of the extended member 30 from the bore 44.

The body member 26 and 28 are pivotally connected by hinge means 62, so as to be pivotable relative to each other about a pivot axis 64 running longitudinally of the tractor 12. Through such hinge means 62, controlled tipping of the cab 22, upon removal of bolt 52 and like bolts associated with the other three like mounting means, can be achieved.

Each extended member 30 and bore 44, including the conical surface thereof, is sized and configured (in relation to the placement of the pivot axis 64) to freely allow such pivoting without interference between any parts, to allow such penetration and removal of the extended member into and from the bore 44.

The spacers 40, 56, 58 act as vibration and noise suppressing means. Spacer 40, and also spacer 56, act to transfer a load placed on the extended member 30 into the approximate direction of the extended end 32 thereof (for example, a load placed down on leg 24), to the socket means 34, through arms 18 and to frame 14.

In fact, all impact and shear loads occurring in the mounting device on roll-over are effectively absorbed by extended members 30, socket means 34, and arms 18, 20 rather than by members such as bolts and/or thin wall structures which are susceptible to failure.

It will be readily noted that the new mounting means described herein, as compared to those of U.S. Pat. No. 3,632,124, will afford a more inexpensive and durable support than exists with the indirect mounting system shown in that patent. The angled conical portions as called for above tolerate substantial initial alignment and contribute to effective securing and maintenance of a tight, durable coupling.

Figure 3:
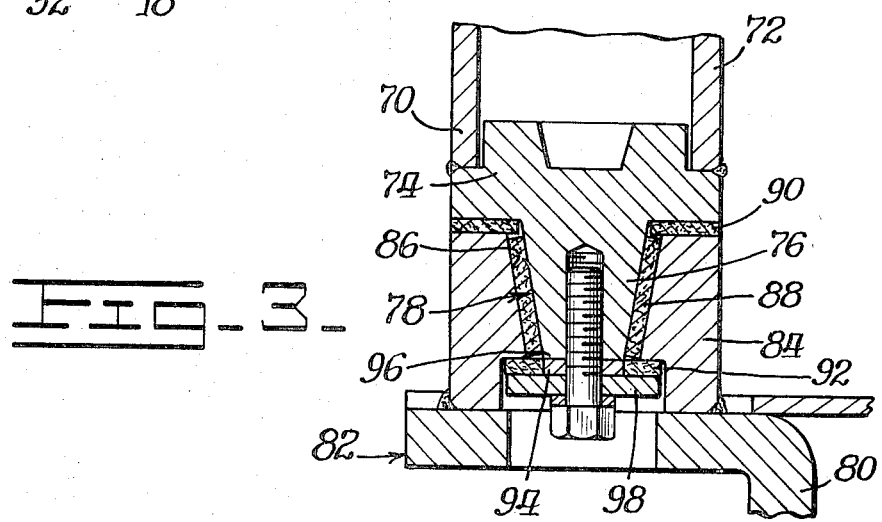
FIG. 3 is a sectional view of a second embodiment of one of the mounting means for use with a tractor and cab structure as shown in FIG. 1.

FIG. 3 shows in section a modification of the subject mounting apparatus. In this embodiment, the bottom end 70 of the leg 72 has welded thereto a body member 74, which includes as an integral part thereof an extended member 76. The socket means 78 are fixed relative to the body member 80 and include a socket base 82 which includes as a part thereof an intermediate member 84. The intermediate member 84 defines aperture 86, with which spacers 88, 90, 92 are associated, as in the previous embodiment. The conical surfaces described above are also a part of this embodiment.

As shown in FIG. 3, overall dimensional control can be achieved by using annular washer means such as shown at 94 for spacing between the extended end 96 of the extended member 76 and the plate 98. Such washer means 94 may, of course, be of a variety of thicknesses to regulate the fit of the telescopically meeting members.

The substantially incompressible spacers described above act to reduce noise which might be transmitted from the frame 14 to the cab 22. That is, in a conventional design, the vibration of a loose structural member such as a fender has a tendency to be carried through to the cab. In the present design, the spacers act as noise suppressors.

It will be understood that the extended members and their respective mating surfaces may take a variety of configurations. For example, they may be of pyramidal or frusto-pyramidal shape, and may be of square, rectangular, or other cross-section. Such selection may be made without departing from the spirit of the invention.

What is claimed is:

1. Mounting apparatus for interconnecting first and second body members comprising:
   an extended member fixed relative to and extending from the first body member and terminating in an extended end;
   socket means fixed relativee to the second body member and defining a bore sized to allow penetration of the extended member therein;
   means associated with the extended member and socket means for (i) limiting penetration of the extended member into the bore after a degree of penetration therein and (ii) transferring a load placed on the extended member in the approximate direction of the extended end thereof to the socket means; and
   means removably securable on the extended end of the extended member with the extended member penetrating into the bore, for fixing the extended member relative to the socket means.

2. The mounting apparatus of claim 1 wherein the means associated with the extended member and socket means for limiting the penetration of the extended member into the bore comprises a tapered surface portion defined by the extended member and tapered inwardly of the longitudinal axis of the extended member in the direction of the extended end of the extended member, and a tapered surface portion defined by the inner surface of the bore and substantially parallel to the tapered surface portion of the extended member with the extended member penetrating into the bore, the tapered surface portions co-acting to so limit the pentration of the extended member into the bore.

3. The mounting apparatus of claim 2 wherein the socket means comprise a socket base defining an aperture, and a substantially incompressible spacer disposed in said aperture, said tapered surface portion defined by the inner surface of the bore being defined by the inner surface of said spacer.

4. The mounting apparatus of claim 3 wherein the means removably securable on the extended end of the extended member comprise a plate removably securable on the extended end of the extended member and sized so that, when so secured with the extended member penetrating into the bore, the plate and socket means co-act to limit removal of the extended member from the bore.

5. The mounting apparatus of claim 4 wherein the socket means further comprise a second substantially incompressible spacer disposed between the plate and a shoulder portion defined by the socket base with the plate so secured and with the extended member penetrating into the bore.

6. The mounting apparatus of claim 5 wherein the socket means further comprise a third substantially incompressible spacer disposed between the socket base and a shoulder portion associated with the extended member and disposed about the extended member with the extended member penetrating into the bore.

7. The mounting apparatus of claim 2 wherein the means removably securable on the extended end of the extended member comprise a plate removably securable to the extended end of the extended member and sized so that, when so secured with the extended member penetrating into the bore, the plate and socket means co-act to limit removal of the extended member from the bore.

8. The mounting apparatus of claim 2 wherein the first and second body members are pivotable relative to each other about a pivot axis, and wherein the extended member and bore, including the tapered surface portions thereof, are configured, in relation to the pivot axis, to allow penetration of the extended member into the bore and removal of the extended member from the bore, with the removably securable means removed from the end of the extended member.

* * * * *